United States Patent
Lochmann et al.

[11] Patent Number: 6,064,197
[45] Date of Patent: May 16, 2000

[54] ANGLE SENSOR HAVING LATERAL MAGNETIC FIELD SENSOR ELEMENT AND AXIAL MAGNETIC FIELD DIRECTION MEASURING ELEMENT FOR DETERMINING ANGULAR POSITION

[75] Inventors: Hans-Ulrich Lochmann; August Petersen, both of Henstedt-Ulzburg, Germany

[73] Assignee: U.S. Philips Corporation, New York, N.Y.

[21] Appl. No.: 09/103,730

[22] Filed: Jun. 24, 1998

[30] Foreign Application Priority Data

Jul. 26, 1997 [DE] Germany ............................ 197 32 238

[51] Int. Cl.⁷ .................. G01B 7/30; G01D 5/16; G01D 5/18
[52] U.S. Cl. ................... 324/207.14; 324/207.2; 324/207.21
[58] Field of Search ..................... 324/165, 173, 324/174, 207.14, 207.2, 207.21, 207.25; 123/406.58, 617

[56] References Cited

U.S. PATENT DOCUMENTS

| | | | |
|---|---|---|---|
| 4,283,679 | 8/1981 | Ito et al. ......................... | 324/207.25 X |
| 4,490,674 | 12/1984 | Ito ..................................... | 324/207.25 |
| 5,497,082 | 3/1996 | Hancock .............................. | 324/207.14 |
| 5,602,471 | 2/1997 | Muth et al. ........................ | 324/207.21 |
| 5,880,586 | 3/1999 | Dukart et al. ................... | 324/207.25 X |

FOREIGN PATENT DOCUMENTS 19543562 5/1996 Germany ......................... G01B 7/30

*Primary Examiner*—Gerard Strecker
*Attorney, Agent, or Firm*—Leroy Eason

[57] ABSTRACT

An angle sensor includes a lateral magnetic field sensor element (1) for producing a sensor signal ($U_S$) which is dependent on the angular position of a target object (6) which is rotatable about an axis of rotation (5). The lateral magnetic field (8) is produced by a magnet (4) which also produces an axial magnetic field (7). Magnetic field sensor elements have a linear characteristic only over an angular range of up to at most 180°. According to the invention, however, in addition to the field sensor element (1) there is also provided a measuring element (2) which determines the direction of an axial magnetic field (7) also produced by magnet (4) and which traverses the measuring element (2). An evaluation circuit (9) is thereby enabled to determine the angular position of the target object (6) from the sensor signal ($U_S$) produced by the magnetic field sensor element (1) and the direction signal ($U_R$) produced by the additional measuring element (2), which determination can be performed over an angular range exceeding 180°.

8 Claims, 3 Drawing Sheets

ANGLE SENSOR HAVING LATERAL MAGNETIC FIELD SENSOR ELEMENT AND AXIAL MAGNETIC FIELD DIRECTION MEASURING ELEMENT FOR DETERMINING ANGULAR POSITION

BACKGROUND OF THE INVENTION

1. Field of the Invention

The invention relates to an angle sensor having a magnetic field sensor element for measuring a sensor signal which is dependent on the angular position of a target object which is rotatable about an axis of rotation relative to the angle sensor and is provided with a magnet.

2. Description of Related Art

An angle sensor of this kind is known from U.S. Pat. No. 5,602,471 assigned to the present Assignee. Therein, the magnetic field sensor element consists of two sensor units which measure in a contactless manner and are arranged with an angular offset relative to one another, each of said sensor units consisting of four magnetoresistive elements which are connected so as to form a measuring bridge. The known angle sensor has a linear characteristic (sensor signal in relation to angular position) in an angle measuring range which, however, amounts to no more than 180°. The characteristic is constant outside the angle measuring range. Using appropriate electronic means, a periodic repetition of the characteristic is achieved (with a period of at the most 180°) in similar known angle sensors. Unambiguous determination of the angular position in the case of angular positions exceeding 180°, however, is not possible using the known angle sensors.

SUMMARY OF THE INVENTION

Therefore, it is an object of the invention to construct an angle sensor of the kind set forth in such a manner that unambiguous angular position determination is possible over a larger angle measuring range.

This object is achieved according to the invention in that there are provided a measuring element for producing a direction signal which is dependent on the direction of the magnetic field traversing the measuring element, and an evaluation circuit for determining the angular position of the target object from the sensor signal and the direction signal.

The direction signal contains information concerning the direction of the magnetic field traversing the measuring element. Because the direction of magnetic field changes upon a 180° rotation of the target object carrying the magnet, the assignment of a measured sensor signal to the appropriate angle measuring range can be based on the direction signal. Such assignment is performed by the evaluation circuit in which angular position is then determined on the basis of the sensor signal. The angle sensor according to the invention thus enables unambiguous determination of the angular position over a larger angle measuring range than in the known angle sensors. When ideal components are used, notably an ideal measuring element enabling determination of the direction of the magnetic field in any angular position and not having a transitional range in which unambiguous direction determination is not possible, the angular position can be determined over the entire angle measuring range of 360°.

An embodiment of the invention has a high measuring sensitivity and a magnetic field sensor element with a linear characteristic over a given angle measuring range.

A further embodiment preferably utilizes a Hall element, notably a Hall element acting as a switch (Switch Hall Sensor) which provides the direction signal exclusively in the form of information whether the traversing magnetic field extends in a first direction, or in the opposite direction or whether the traversing magnetic field has an essential magnetic field component in a first direction or in the opposite direction. The use of such a Hall element is particularly attractive since the evaluation of the direction signal is then very simple.

In another embodiment the arrangement of the measuring element is particularly attractive since the direction of the magnetic field can then be determined in the simplest manner. A Hall element is a particularly suitable measuring element for use in such an embodiment.

Another embodiment notably has a space-saving and cost-saving effect. The measuring element and the evaluation circuit in particular are constructed as a common semiconductor component. The integration of the magnetic field sensor element in the common component would also be feasible, but it is preferably arranged on the axis of rotation of the measuring object whereas the measuring element and the evaluation circuit are preferably arranged adjacent the axis of rotation and hence at a distance from the magnetic field sensor element.

Another embodiment enables unambiguous determination of angular position throughout the angle measuring range of up to 360°, even when the measuring elements are not ideal and have a transitional zone in which unambiguous determination of the direction of the magnetic field is not possible. Preferably, the measuring elements are arranged on different radial lines which start from the axis of rotation, so that always at least one measuring element enables unambiguous determination of the direction of the magnetic field. All measuring elements can also be arranged on the common semiconductor component, together with the evaluation circuit.

The invention also relates to a position sensor, notably a steering angle sensor for measuring the steering angle of the steering wheel in a vehicle, or a position sensor for measuring the angular position of the cam shaft or an associated auxiliary shaft in/on a vehicle engine in order to achieve (variable) valve control, using an angle sensor according to the invention, as well as to a vehicle in which such a position sensor is included. The angle sensor according to the invention can also be used for determining the angular position of the shaft of an electric motor, a turbine, a generator or a wind rose, so generally wherever angular positions of between 0° and 360° need be determined. If, for example, for the determination of the angular position of a steering wheel it is also necessary to determine the angular position in an even larger angular range, further means should be provided which determine and store, for example the number of revolutions.

BRIEF DESCRIPTION OF THE DRAWINGS

The invention will be described in detail hereinafter with reference to the drawings. Therein.

DESCRIPTION OF THE PREFERRED EMBODIMENTS

Figure 1:
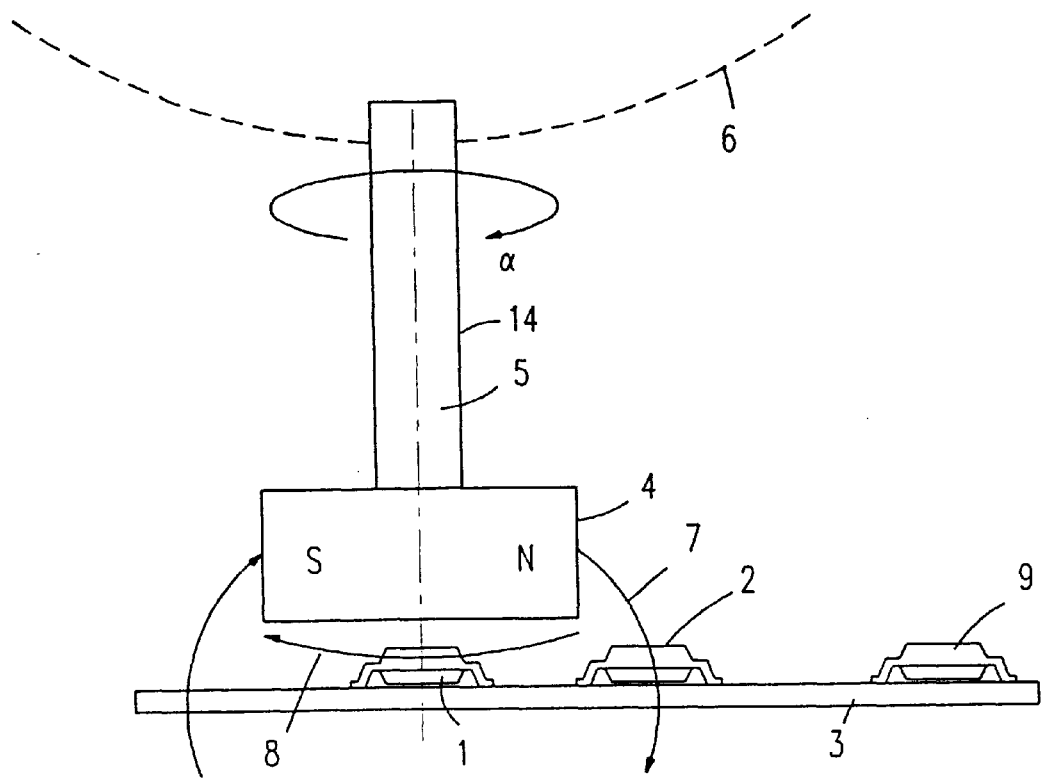
FIG. 1 shows diagrammatically an angle sensor according to the invention for determining an angular position.

FIG. 1 shows an angle sensor according to the invention which includes a magnetic field sensor element 1, a measuring element 2 and an evaluation circuit 9, said elements being arranged on a printed circuit board 3. The magnetic field sensor element 1 is arranged very close to a magnet 4 which is rigidly connected, via a shaft 14, to a target object 6, for example a steering wheel of a vehicle. The magnet 4, being constructed as a flat, round disc, is rotationally symmetrically arranged relative to the axis of rotation 5 around which the target object 6 can be rotated. The angle sensor is intended to determine the angular position α of the target object 6 at any instant. To this end, the magnetic field sensor element 1, formed by a magnetoresistive sensor (MR sensor) in the present case, is arranged at a small axial distance from the magnet 4 and on the axis of rotation 5 in such a lateral manner that the magnetic field sensor element 1 is traversed by a magnetic flux 8 of the magnetic field generated by the magnet 4 essentially in the direction perpendicular to the axis of rotation 5. The magnetoresistive elements of the magnetic field sensor element 1 are sensitive to the lateral magnetic field extending in a direction perpendicular to the axis of rotation 5. The magnitude of the sensor signal $U_s$ produced by the MR sensor 1 then varies as a function of the angle α.

However, the magnetic field sensor element 1 alone is not capable of unambiguously determining the angular position α from 0° to 360°, because the characteristic thereof is unambiguous only for a measuring range of 180°. Therefore, according to the invention the measuring element 2, being a Hall element in this case, is arranged so as to be laterally offset adjacent the magnetic field sensor element 1, so that it is traversed by the magnetic flux 7, extending essentially parallel to the axis of rotation 5, of the magnetic field generated by the magnet 4. The measuring element 2 is arranged in such a manner that it is sensitive to a magnetic field extending in the axial direction and it supplies a direction signal $U_R$ which, in simplest case, contains only the information whether the magnetic flux 7 traversing it is directed away from the target object 6 (so downwards as shown in the Figure) or towards the target object 6 (upwards in the Figure, in another angular position α, not shown, in which the south pole S of the magnet 4) neighbors the measuring element 2 instead of its north pole).

Figure 2:
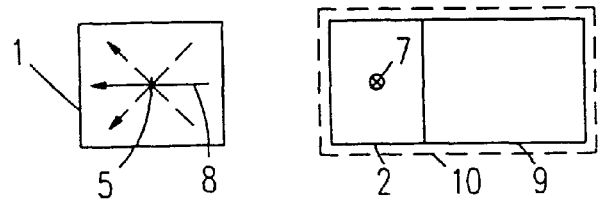
FIG. 2 is a plan view of the arrangement of the individual elements of the angle sensor.

FIG. 2 shows the arrangement of the elements of the angle sensor in a plan view. For the sake of clarity, the direction of the lateral flux 8 traversing the magnetic field sensor element 1 is also indicated, the dashed lines representing the direction of this magnetic field for a different angular position α. The direction of the axial magnetic flux 7 traversing the measuring element 2 is also indicated. The measuring element 2 and the evaluation circuit 9 are constructed as a common semiconductor component 10 so as to save space.

Figure 3:
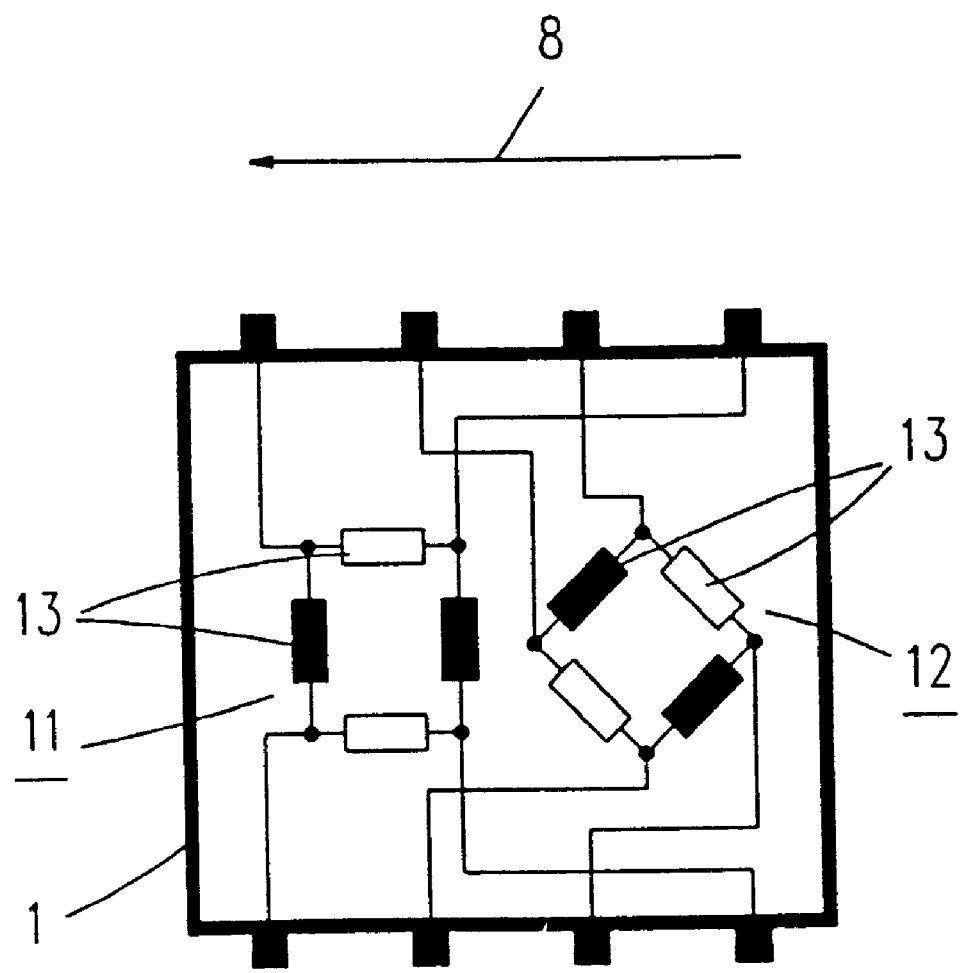
FIG. 3 is a detailed representation of an MR sensor used as a magnetic field sensor element.

FIG. 3 shows a part of an embodiment of the MR sensor 1 used as the magnetic field sensor element. It includes two measuring bridges 11, 12, each of which consists of four magnetoresistive elements 13, the individual magnetoresistive elements 13 of a measuring bridge 11, 12 always being arranged at an angle of 90° relative to one another. As is shown, the two measuring bridges 11, 12 are preferably arranged so as to be rotated 45° relative to one another. The MR sensor 1 shown is sensitive to a magnetic field extending in the plane of the drawing, for example to a magnetic field 8, and is arranged in such a manner that the axis of rotation 5 (see FIG. 1) extends perpendicularly to the plane of the drawing and through the center of the MR sensor 1. Each of the two measuring bridges 11, 12 has a respective sine-shaped periodic characteristic. The characteristics are converted into a characteristic which is linear in an angle range of up to at the most 180° by means of appropriate switching means (not shown). The elements 13 of the measuring bridge 11, 12 can also be nested into one another as shown in U.S. Pat. No. 5,602,471. Reference is made to the cited state of the art for a description of the operation of such an MR sensor.

Figure 4:
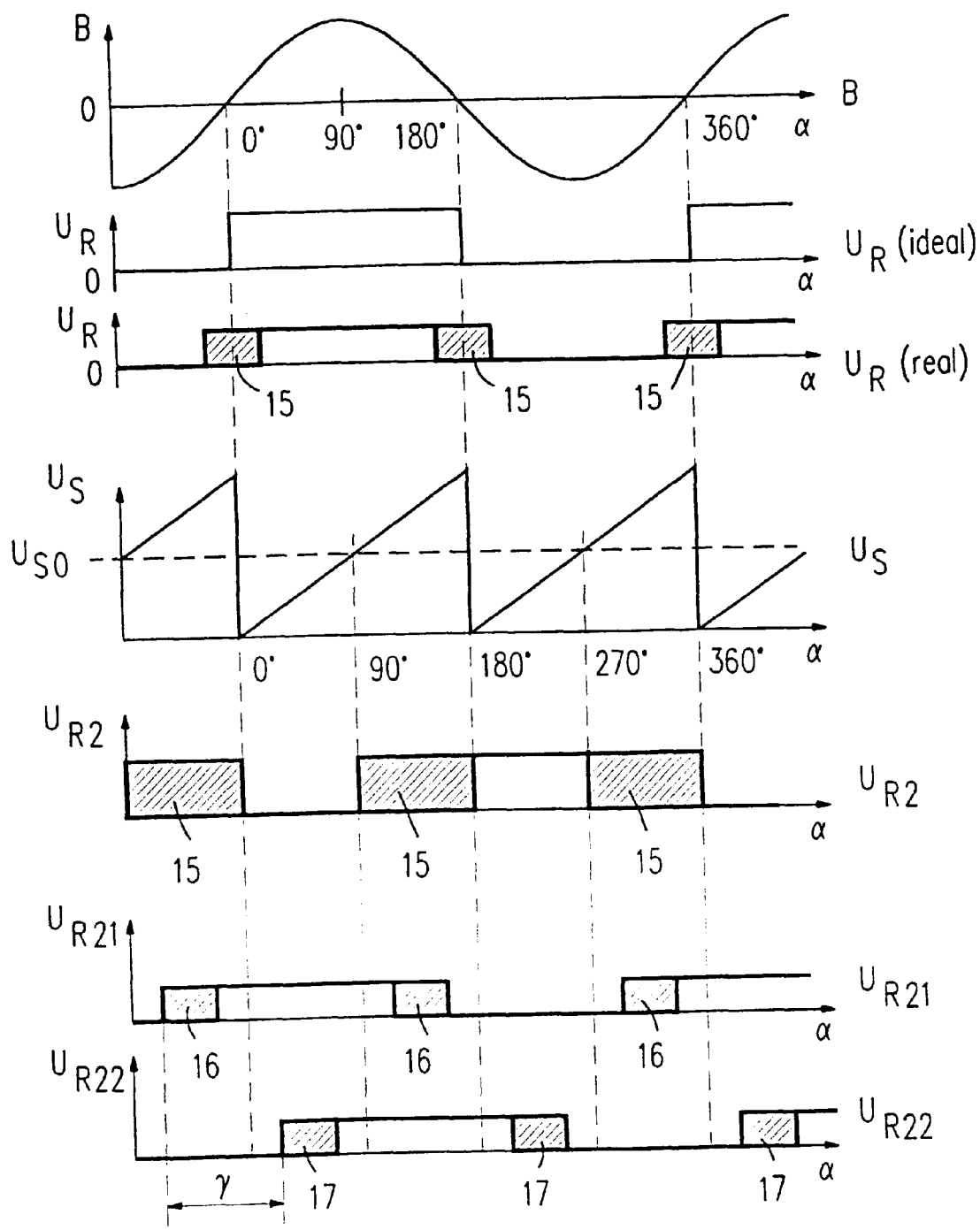
FIG. 4 shows various signals relating to the angle sensor according to the invention.

FIG. 4 shows various signal waveforms in dependence on the angular position α so as to illustrate the operating principle of the angle sensor. The first line shows the variation of the magnetic flux B traversing the Hall element 2. For α=90°, the north pole of the magnet 4 is nearest to the Hall element 2 (this is the situation shown in FIG. 1) and the magnetic flux B exhibits a maximum.

The second line shows the variation of the direction signal $U_R$ of an ideal Hall element 2. The direction signal $U_R$ exhibits a voltage transient at the zero crossings of the magnetic flux B so that the direction signal $U_R$ contains the information concerning the direction of the magnetic field at the Hall element 2.

The direction signal $U_R$ of a real Hall element, however, varies as shown on the third line, this variation involves transitional zones 15 in an angular range around the zero crossings of the magnetic flux, unambiguous determination of the direction of the magnetic field at the Hall element 2 not being possible in such transitional zones. The width of such a transitional zone 15 varies as a function of the strength of the magnetic field of the magnet 4, of the distance between the Hall element 2 and the magnet 4, and of the type of Hall element 2. It may be that the voltage transient occurs by chance in an arbitrary angular position α within the transitional zone 15, or that the measuring voltage continuously increases or decreases, so that no unambiguous variation of the direction signal $U_R$ can be determined in the transitional zone 15.

The fourth line shows the variation of the sensor signal $U_S$ of an MR sensor 1. This characteristic is repeated with a period of α=180°. It is desired to enable an angle measuring range of at least 270° to be covered by means of such an MR senor element 1 and a single (real) Hall element 2. To do so Hall element 2, whose transitional zone 15 must then be ≦90°, is arranged in such a manner that the transitional zones 15 of the direction signal are situated in an angular range of the desired angle measuring range of 270° in which the characteristic (the sensor signal $U_S$) is unambiguous, so in the range between α=90° and α=180°. Thus, in this angle range the direction signal $U_{R2}$ is not required; the direction signal $U_{R2}$ is required only in the angle ranges between 0° and 90° (where the Hall element 2 does not supply a signal) and between 180° and 270° (where the Hall element 2 supplies a signal) in order to decide in which angle range a measured sensor signal $U_S$ is situated. This is realized by means of the evaluation circuit which receives the measured sensor signal $U_S$ and the direction signal $U_{R2}$:

for $U_{R2}=0$ and $U_s<U_{s0}$ it holds that: $0°<α<90°$.

For $U_{R2}≠0$ and $U_s<U_{s0}$ it holds that: $180°≦α≦270°$.

For $U_s>U_{s0}$ it holds that ($U_{R2}$ not required): $90°≦α≦180°$.

In order to achieve the described situation of the transitional zones 15 as required for this embodiment, the Hall element 2 is arranged in a different position, that is to say on a radial line which starts from the axis of rotation 5 at α=45°

(in FIG. 1 the Hall element 2 is situated on a radial line at α=90°). Such an arrangement thus enables unambiguous angular position determination between 0° and 270°. In order to ensure that the target object cannot reach an angular position beyond that value, for example a mechanical stop may be provided.

Figure 5:
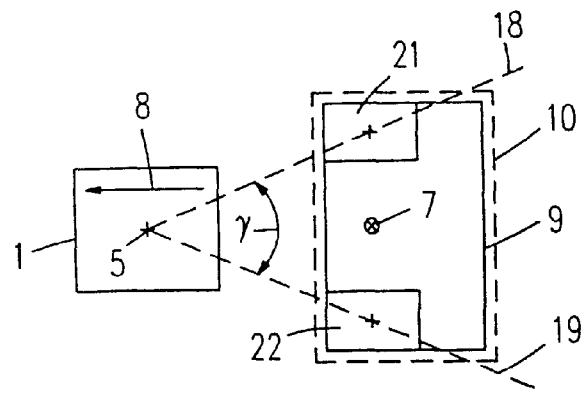
FIG. 5 shows the arrangement of the individual elements in an angle sensor comprising two measuring elements.

If the angle measuring range is to be extended further, possibly to 360°, either a measuring element 2 having smaller transitional zones 15 must be used or an additional, second measuring element (for example, a second Hall element) is used. Such an arrangement is shown in FIG. 5. Two Hall elements 21, 22 are then accommodated, together with the evaluation circuit 9, on the semiconductor component 10, their radial position having been shifted through the angle γ, i.e. the first Hall element 21 is arranged on a first radial line 18 and the second Hall element 22 on a second radial line 19. The last two lines of FIG. 4 show the associated variations of the direction signals $U_{R21}$ and $U_{R22}$. Because the Hall elements 21, 22 are arranged on different radial lines 18, 19, their transitional zones 16, 17 will be situated so as to be offset by the angle γ relative to one another. The angle γ should be chosen so that the transitional zones 16 and 17 do not overlap in any zone of the angle α. It is thus achieved that always at least one direction signal $U_{r21}$, $U_{r22}$ will have an unambiguous value and hence enables unambiguous determination of the characteristic range in which a measured sensor signal $U_s$ is situated. For the signal variations shown, for example the direction signal $U_{R21}$ for α=0° to 90° and α=180° to 270° is used for the decision, whereas for the remaining angle ranges the direction signal $U_{R22}$, is used to determine the characteristic range. This is again performed in the evaluation circuit which receives said signals:

for $U_{R21}=0$ and $U_s<U_{s0}$ it holds that: $180°\leq\alpha\leq270°$.

For $U_{R21}\neq0$ and $U_s<U_{s0}$ it holds that: $0°\leq\alpha\leq90°$.

For $U_{R22}=0$ and $U_s >U_{s0}$ it holds that: $270°\leq\alpha\leq360°$.

For $U_{R22}\neq0$ and $U_S >U_{s0}$ it holds that: $90°\leq\alpha\leq180°$.

Preferably, γ=90° is chosen, because in such an arrangement the distance between the transitional zones 16 and 17 is maximum. The Hall elements 21, 22, moreover, are preferably arranged so as to be offset 45° with respect to the position shown in FIG. 1 (for example, the Hall element 21 on a radial line at α=135° and the Hall element 22 on a radial line at α=45°) and preferably are constructed so as to be identical.

Instead of a Hall element, use can be made of another measuring element capable of unambiguously determining the direction of a magnetic flux traversing the measuring element, for example a suitable measuring element with magnetoresistive elements. The measuring element may also be arranged in positions other than those shown in the Figures, in as afar as it is also possible to determine the direction of the magnetic field at the relevant area.

What is claimed is:

1. An angle sensor comprising a magnet (4) for providing a magnetic field and a sensor element (1) responsive to a lateral component (8) of the magnetic field to produce a sensor signal ($U_S$) indicative of the angular position (α) of a target object (6) which is rotatable about an axis of rotation (5), the magnet being supported on and rotatable with the target object (6); characterized in that the angle sensor further comprises:

(i) a measuring element (2) which is arranged adjacent the axis of rotation and produces a direction signal ($U_R$) indicative of the direction of an axial component (7) of the magnetic field which traverses the measuring element; and (ii) an evaluation circuit (9) for determining said angular position (α) of the target object (6) based on the sensor signal ($U_S$) and the direction signal ($U_R$).

2. An angle sensor as claimed in claim 1, wherein the magnetic field sensor element (1) is a magnetoresistive device (MR) which consists of a plurality of magnetoresistive elements (13) which are connected so as to form one or more measuring bridges (11, 12).

3. An angle sensor as claimed in claim 1, wherein the magnetic field sensor element (1) has two measuring bridges (11, 12) oriented at an angle of 45° relative to one another.

4. An angle sensor as claimed in claim 1, wherein the measuring element (2) is a Hall effect device.

5. An angle sensor as claimed in claim 1, wherein the measuring element (2) and the evaluation circuit (9) constitute a single component (10).

6. An angle sensor as claimed in claim 1, further comprising at least one further measuring element (22) which is displaced from said axis and produces at least one further direction signal ($U_{R22}$) indicative of the direction of said axial component (7) of the magnetic field traversing said further measuring element (22).

7. An angle sensor as claimed in claim 6, wherein the measuring elements (21, 22) are arranged on different radial lines (18, 19) which start from the axis of rotation (5) of the target object (6) and are offset 90° relative to one another.

8. An angle sensor as claimed in claim 1, wherein the evaluation circuit (9) determines an angular range in which the measured sensor signal ($U_S$) is situated on the basis of the direction signal ($U_R$), and subsequently determines the angular position (α) in said angular range on the basis of the sensor signal ($U_s$).

* * * * *